US012136771B2

(12) United States Patent
Ma et al.

(10) Patent No.: US 12,136,771 B2
(45) Date of Patent: Nov. 5, 2024

(54) HYBRID ANTENNAS

(71) Applicant: Hewlett-Packard Development Company, L.P., Spring, TX (US)

(72) Inventors: Chin-Hung Ma, Taipei (TW); Chien-Pai Lai, Taipei (TW); Pai-Cheng Huang, Taipei (TW); Tsai-Yun Chuang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/040,605

(22) PCT Filed: Sep. 11, 2020

(86) PCT No.: PCT/US2020/050518
§ 371 (c)(1),
(2) Date: Feb. 3, 2023

(87) PCT Pub. No.: WO2022/055499
PCT Pub. Date: Mar. 17, 2022

(65) Prior Publication Data
US 2024/0305016 A1 Sep. 12, 2024

(51) Int. Cl.
*H01Q 21/28* (2006.01)
*H01Q 1/24* (2006.01)
*H01Q 5/40* (2015.01)
*H01Q 21/06* (2006.01)

(52) U.S. Cl.
CPC ............... *H01Q 21/28* (2013.01); *H01Q 5/40* (2015.01); *H01Q 21/065* (2013.01); *H01Q 1/243* (2013.01)

(58) Field of Classification Search
CPC ........ H01Q 21/28; H01Q 5/40; H01Q 21/065; H01Q 1/243
See application file for complete search history.

(56) References Cited

U.S. PATENT DOCUMENTS

| | | | | |
|---|---|---|---|---|
| 8,971,821 | B2 | 3/2015 | Schlub et al. | |
| 9,368,881 | B2 | 6/2016 | Lee et al. | |
| 9,520,650 | B2 | 12/2016 | Yang et al. | |
| 2019/0123441 | A1* | 4/2019 | Sudo | H01Q 1/243 |
| 2019/0334232 | A1 | 10/2019 | Ha et al. | |
| 2020/0021009 | A1 | 1/2020 | Huang et al. | |
| 2020/0036083 | A1 | 1/2020 | Kim et al. | |
| 2020/0067178 | A1* | 2/2020 | Hu | H01Q 1/36 |
| 2020/0106166 | A1 | 4/2020 | Wu et al. | |

FOREIGN PATENT DOCUMENTS

| | | | |
|---|---|---|---|
| CN | 110444863 | A | 11/2019 |
| EP | 0383292 | A2 | 8/1990 |

* cited by examiner

*Primary Examiner* — Daniel D Chang
(74) *Attorney, Agent, or Firm* — Knobbe, Martens, Olson & Bear, LLP

(57) ABSTRACT

An example apparatus may include a first antenna having a first radiator and a first ground plane and a second antenna having a second radiator and a second ground plane. In some examples, a hybrid antenna may be formed through coupling of the hybrid antenna to components of the first antenna and the second antenna. The hybrid antenna may include a third radiator. In some examples, an electrical interface may be disposed between the first antenna and the second antenna. In this regard, the electrical interface may couple the first ground plane to the second ground plane to form the third radiator.

15 Claims, 3 Drawing Sheets

HYBRID ANTENNAS

BACKGROUND

Computing devices, including mobile phones, laptop computers, and/or the like, may include antennas to enable wireless communication. In some examples, the computing devices may include multiple antennas that may operate at different frequencies with respect to each other.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
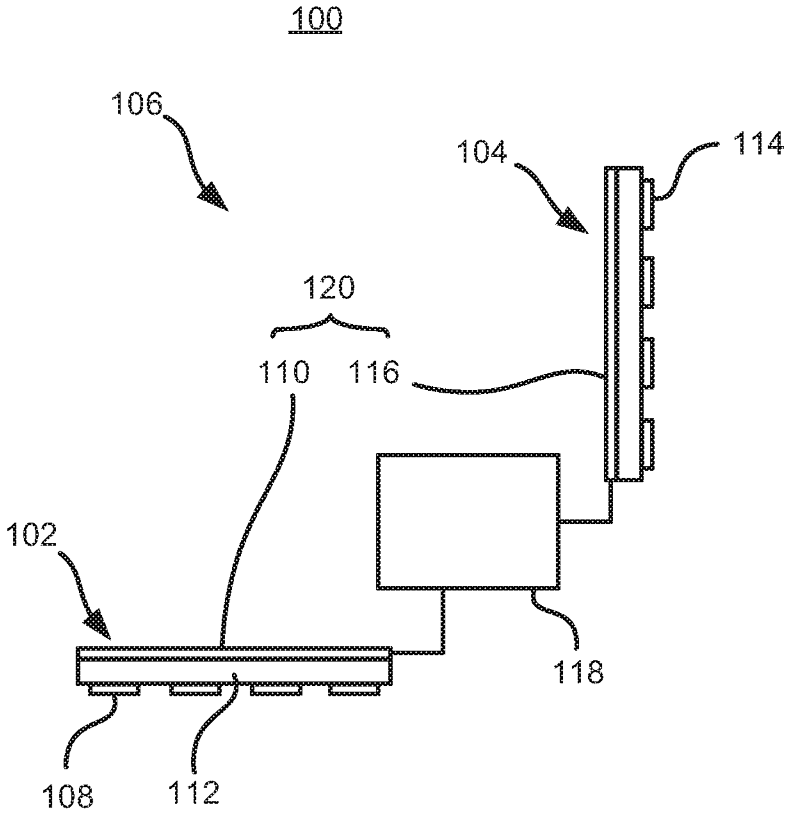
FIG. 1 depicts a block diagram of an example apparatus that may include a first antenna, a second antenna, and a third antenna, in which the third antenna may be formed through coupling of components of the first antenna and the second antenna.

Computing devices, such as laptop computers, smartphones, tablet computers, and the like, may include an antenna for wireless communication. In some examples, the computing devices may include multiple antennas for communication over different wireless technologies such as, for instance, 4G, 5G, Wi-Fi, Bluetooth, wireless local area network (WLAN), wireless wide area network (WWAN), and/or the like.

In some examples, wireless technology implemented in the computing device may use a millimeter wave (mmWave) antenna to transfer signals. By way of particular example, 5G wireless technology may enable, for instance, increased data speeds, reduced latency, increased reliability and availability, when compared to 4G wireless technology. However, the addition of mmWave antennas in computing devices may present certain concerns, such as increasing the amount of space that may be occupied by the many different types of antennas installed in the computing devices. For instance, a wireless technology implemented in a computing device may use both a high frequency band (e.g., mmWave) antenna and a low frequency band (e.g., sub-6 GHZ) antenna. In some examples, the mmWave antenna may have high directivity, and thus multiple mmWave antennas may be disposed and positioned in different directions to achieve greater coverage. In this regard, the mmWave antenna(s) as well as the sub-6 GHz antenna may occupy a relatively large amount of space in the computing device, which may cause the computing device to be relatively large to accommodate the multiple antennas.

Disclosed herein are apparatuses that may include a hybrid antenna. In some examples, the apparatuses may combine or share antenna components between different wireless technologies, for instance, components of a mmWave antenna may be shared with a sub-6 GHz antenna. In this regard, the hybrid antenna may operate as both a mmWave antenna and a sub-6 GHz antenna (e.g., a WLAN antenna or a WWAN antenna). The hybrid antenna may occupy less space in the apparatus than separate antennas. In some examples, different combinations of hybrid antennas and other antennas, such as WLAN and/or WWAN antennas, may be implemented in apparatuses to reduce an amount of space consumed by the antennas installed in the apparatuses. As a result, the apparatuses with the hybrid antenna may be fabricated to have relatively small sizes, e.g., minimized, optimized, and/or the like.

In some examples, apparatuses disclosed herein may include a hybrid antenna that may be formed through an electrical interface (e.g., interposer board) coupled to components of antennas. The electrical interface may couple components of two separate antennas to form the hybrid antenna. In this regard, the electrical interface may couple a first antenna to a second antenna, in which the first antenna may include a first radiator and a first ground plane, and the second antenna may include a second radiator and a second ground plane. The electrical interface may couple the first ground plane and the second ground plane to form a third radiator for the hybrid antenna.

FIG. 1 shows a block diagram of an example apparatus 100 that may include a first antenna 102, a second antenna 104, and a third antenna 106, in which the third antenna 106 may be formed through coupling of components of the first antenna 102 and the second antenna 104. In some examples, components of the first antenna 102 and the second antenna 104 may be coupled by establishing an electrical connection between the first antenna 102 and the second antenna 104. It should be understood that the apparatus 100 depicted in FIG. 1 may include additional features and that some of the features described herein may be removed and/or modified without departing from the scope of the apparatus 100.

The apparatus 100 may be an electronic device, such as a laptop computer, a desktop computer, a tablet computer, a smartphone, an electronic device such as Internet of Things (IoT) device, and/or the like. The apparatus 100 may include a controller board (shown in FIG. 2) that may include, for instance, a processor such as a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

In some examples, the apparatus 100 may include a memory (not shown), which may include, for example, a non-volatile memory such as, Read-Only Memory (ROM), flash memory, solid state drive, Random-Access memory (RAM), an Electrically Erasable Programmable Read-Only Memory (EEPROM), a storage device, an optical disc, or the like. By way of example, the memory may be non-volatile random-access memory (NVRAM). In some examples, the memory may store instructions that, when executed by the processor, may process signals for transmission/reception through the antennas 102, 104, or 106, or a combination thereof.

In some examples, the first antenna 102 may include a first radiator 108 and a first ground plane 110. As shown in FIG. 1, the first radiator 108 may be separated from the first ground plane 110 by a substrate 112, e.g., a substrate formed of a dielectric material. The second antenna 104 may include a second radiator 114 and a second ground plane 116. In some examples, the first antenna 102 and the second antenna 104 may be patch antennas implemented as mmWave antennas.

By way of particular example and for purposes of illustration, a patch antenna may be a type of radio antenna that may include a flat sheet or "patch" of conductive material (e.g., metal) mounted over a larger sheet of conductive material that may operate as a ground plane. In some examples, the patch antenna may be implemented as a planar inverted-F antenna (PIFA), in which a portion of the patch may be grounded at a grounding point, for instance, by a ground pin.

In some examples, the third antenna 106 may be a hybrid antenna. A hybrid antenna may be an antenna that is formed by combining different elements from multiple antennas. For instance, the third antenna 106 may be an antenna of a first type (e.g., sub-6 GHZ), which may be a hybrid formed through coupling of multiple antennas of a second type (e.g., mmWave), for instance, the first antenna 102 and the second antenna 104. In this regard, the first ground plane 110 and the second ground plane 116 of a patch antenna may appear as a planar patch for a PIFA antenna, and as such the hybrid antenna 106 may operate as both a mmWave antenna and a PIFA antenna.

In this regard, an electrical interface 118 may be disposed between the first antenna 102 and the second antenna 104 to couple, for instance, the first ground plane 110 to the second ground plane 116 to form a third radiator 120. As discussed herein, the third radiator 120 of the hybrid antenna 106 may be implemented for a frequency range that may be less than a frequency range of the first antenna 102 and the second antenna 104, for instance by having a length t to a wavelength of a signal in the frequency range for the hybrid antenna 106. In this instance, a length of the third radiator 120 may be based on a combination of a length of the first ground plane 110 and a length of the second ground plane 116.

Figure 2:
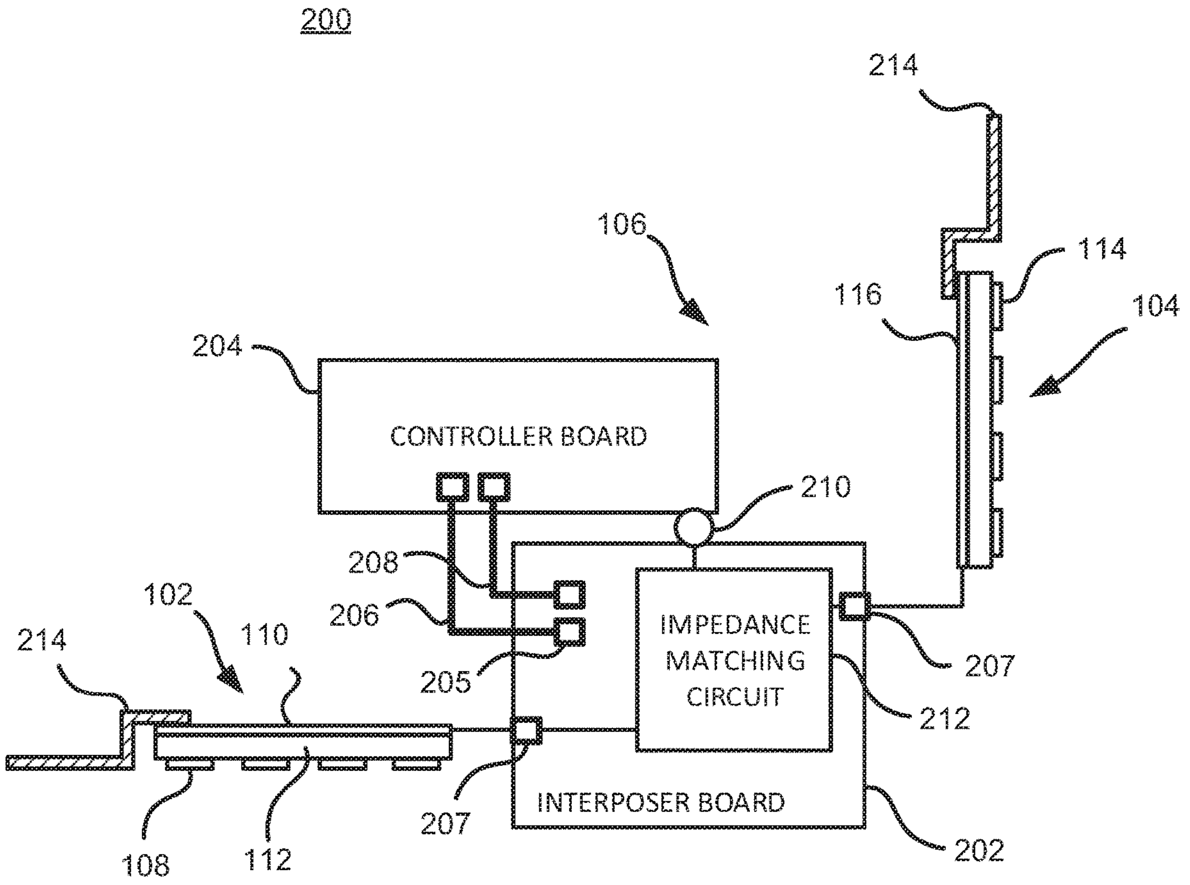
FIG. 2 shows a block diagram of an example apparatus that may include an interposer board to couple a first ground plane of a first antenna to a second ground plane of a second antenna to form a first radiator of a third antenna.

FIG. 2 shows a block diagram of an example apparatus 200 that may include an interposer board 202 to couple a first ground plane 110 of a first antenna 102 to a second ground plane 116 of a second antenna 104 to form a third radiator 120 of a hybrid antenna 106. It should be understood that the apparatus 200 depicted in FIG. 2 may include additional features and that some of the features described herein may be removed and/or modified without departing from the scope of the apparatus 200. The description of the apparatus 200 is made with reference to the features of apparatus 100 depicted in FIG. 1 for purposes of illustration.

The apparatus 200 may include the first antenna 102 having the first ground plane 110 and the second antenna 104 having the second ground plane 116 as depicted in FIG. 1. The first antenna 102, the second antenna 104, or a combination thereof may be tuned to a first frequency range, for instance, a mmWave frequency range. In this regard, the first antenna 102 and the second antenna 104 may have high directionality, and in some examples, the first antenna 102 and the second antenna 104 may be positioned separately from each other and may be oriented in different directions to achieve greater signal coverage.

In some examples, the first antenna 102 and the second antenna 104 may be tuned to operate at a higher or lower frequency range than the hybrid antenna 106. By way of particular example and for purposes of illustration, the first antenna 102 and the second antenna 104 may be tuned as mmWave antennas. In this instance, the first radiator 108 of the first antenna 102 may be oriented in a first direction and the second radiator 114 of the second antenna 104 may be oriented in a second direction that is different than the first direction, e.g., orthogonal relative to each other. In some examples, the first antenna 102 and the second antenna 104 may be oriented to overlap in coverage, oriented to avoid interference with other nearby antennas, and/or the like.

In some examples, the hybrid antenna 106 may be tuned to a second frequency range that may be different than the first frequency range of the mmWave antennas. In some examples, the second frequency range may be lower than the first frequency range, for instance, a sub-6 GHz frequency range such as for WLAN or WWAN.

In some examples, the interposer board 202 may be disposed between the first antenna 102 and the second antenna 104 and may couple the first ground plane 110 to the second ground plane 116 to form a third radiator 120 of the hybrid antenna 106. In some examples, the interposer board 202 may be the same as the electrical interface 118 depicted in FIG. 1.

In some examples, the interposer board 202 may include a first connector 205 coupled to a controller, such as a controller board 204, and a second connector 207 coupled to the first antenna 102, the second antenna 104, or a combination thereof. In some examples, the first connector 205 and the second connector 207 may be a mmWave connector, a circuit trace, a metal pad, a flexible printed circuit (FPC), a laser direct structuring (LDS), and/or the like. In some examples, the controller board 204 may be a motherboard, or the like, and may include a radio module.

The interposer board 202 may be an electrical interface, such as the electrical interface 118 depicted in FIG. 1. In addition, the interposer board 202 may route a connection from one component to another, for instance, to change a pitch of a connection, to reroute a connection to a different component, and/or the like.

In some examples, the interposer board 202 may include a cable 206 coupled between the first antenna 102 and the controller board 204. The cable 206 may be a feeding point for the first antenna 102 to transfer signals to/from the first radiator 108 of the first antenna 102. The interposer board 202 may include a second cable 208 coupled between the second antenna 104 and the controller board 204 and the second cable 208 may be a feeding point for the second antenna 104 to transfer signals to/from the second radiator 114 of the second antenna 104. In some examples, the interposer board 202 may be a flex circuit, and the cable 206, the cable 208, or a combination thereof may be flex cables.

In some examples, the interposer board 202 may include a feeding point 210 for the hybrid antenna 106. The feeding point 210 may be a signal input, which may include a connector to couple the hybrid antenna 106 and the controller board 204. By way of particular example and for purposes of illustration, the hybrid antenna 106 may be a PIFA antenna, and in this instance, a grounding point for the PIFA antenna may be implemented using the first cable 206 of the first antenna 102, the second cable 208 of the second antenna 104, or a combination thereof. For instance, the first ground plane 110 of the first antenna 102 may be an antenna radiator, or patch, for the PIFA antenna, and the cable 206 may act as the grounding point. As such, the first cable 206, the second cable 208, or a combination thereof may be positioned at a location (or a distance) relative to the feeding point 210 of the hybrid antenna 106 to tune the PIFA antenna.

In some examples, the interposer board 202 may include an impedance matching circuit 212, which may be implemented to tune the hybrid antenna 106. The impedance matching circuit 212 may be coupled between the first ground plane 110 of the first antenna 102 and the second ground plane 116 of the second antenna 104 to tune a frequency range of the hybrid antenna 106. By way of particular example, the hybrid antenna 106 may be a WWAN or WLAN antenna tuned to a frequency range, such as a sub-6 GHz range, which is lower than a frequency range of the first antenna 102, such as a 26 GHz range for mmWave antennas.

In some examples, the hybrid antenna 106 may include a fourth radiator 214 connected to the first ground plane 110 of the first antenna 102. The fourth radiator 214 may extend a length of the first ground plane 110 to enable tuning of the frequency range of the hybrid antenna 106. For instance, a wave length of a signal associated with the frequency range of the hybrid antenna 106 may be greater than a combined length of the first ground plane 110 and the second ground plane 116, and in this instance, the fourth radiator 214 may be disposed to extend a length of the third radiator 120 to tune to the wavelength of the signal. In some examples, the fourth radiator may be referred to as an auxiliary radiator and may be implemented as an extended metal portion connected to the first ground plane 110, the second ground plane 116, or a combination thereof. In this regard, the fourth radiator 214 may be formed in a FPC, an LDS, and/or the like, to attach the fourth radiator 214 to the hybrid antenna 106.

Figure 3:
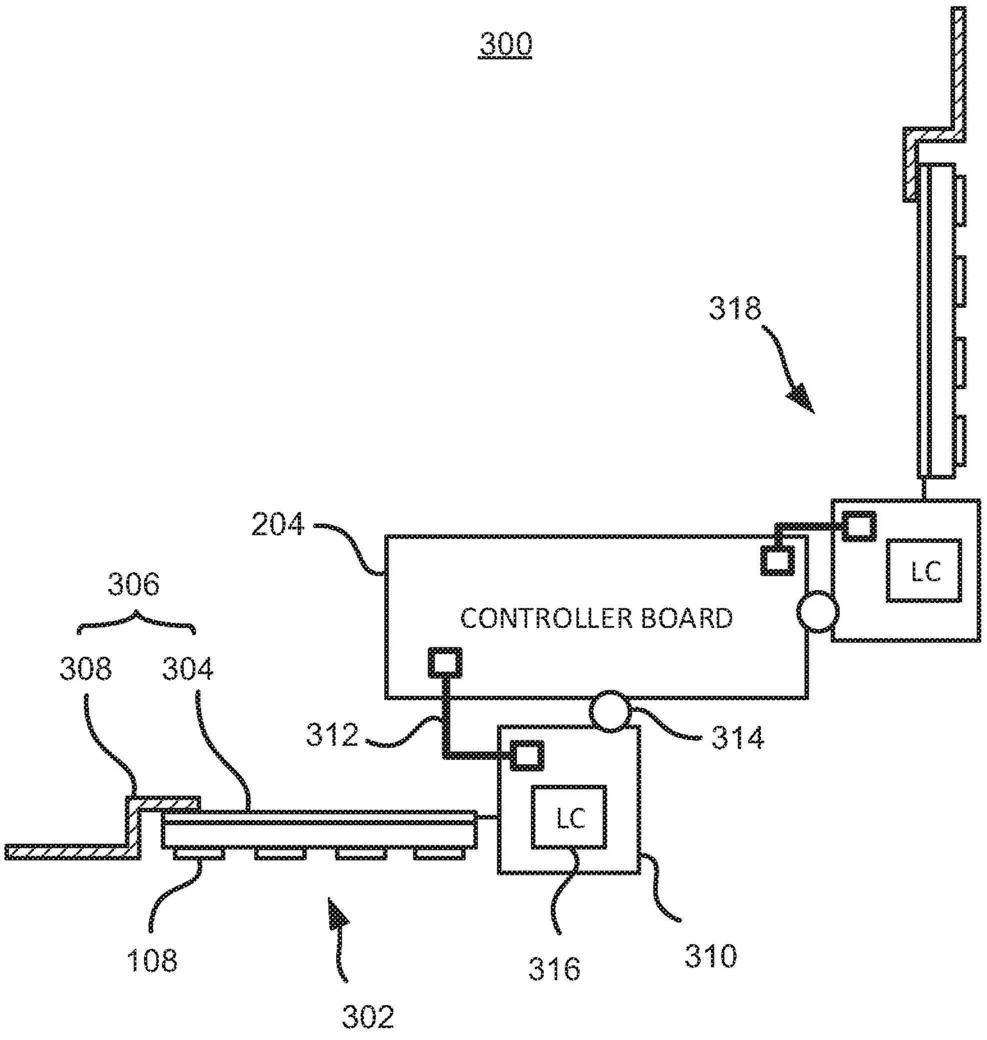
FIG. 3 shows a block diagram of an example apparatus that may include a first antenna, a second antenna, and an interposer board connecting the first antenna to a controller board, in which a ground plane of the first antenna may be connected as a first signal radiator for the second antenna.

FIG. 3 shows a block diagram of an example apparatus 300 that may include a first antenna 302, a second antenna 306, and an interposer board 310 connecting the first antenna 302 to a controller board 204, in which a ground plane 304 of the first antenna 302 may be connected as a first signal radiator for the second antenna 306. It should be understood that the apparatus 300 depicted in FIG. 3 may include additional features and that some of the features described herein may be removed and/or modified without departing from the scope of the apparatus 300. The description of the apparatus 300 is made with reference to the features of the apparatus 100 and the apparatus 200 depicted in FIGS. 1 and 2 for purposes of illustration.

As shown, the apparatus 300 may include a first antenna 302, which may be similar to the first antenna 102 depicted in FIGS. 1 and 2. The first antenna 302 may have a ground plane 304 and may be tuned to a first frequency range. For instance, the first antenna 302 may be implemented as a patch array antenna that may be tuned to a millimeter wave spectrum.

In some examples, the apparatus 300 may include a second antenna 306 tuned to a second frequency range, e.g., the sub-6 GHz range. The second frequency range may be lower than the first frequency range of the first antenna 302. In some examples, the ground plane 304 of the first antenna 302 may be connected as a first signal radiator for the second antenna 306 and a second signal radiator 308 may be connected to the ground plane 304 of the first antenna 302. The second signal radiator 308 may be similar to the fourth radiator 214 depicted in FIG. 2. In this regard, the second signal radiator 308 may extend a length of the ground plane 304 to tune the second frequency range of the second antenna 306.

In some examples, the apparatus 300 may include an interposer board 310 that may connect the first antenna 302 to a controller board 204. The interposer board 310 may include a first antenna feeding point 312 to transfer a signal to the first radiator 108 of the first antenna 302. In some examples, the first antenna feeding point 312 may be a cable that may be coupled between the first radiator 108 of the first antenna 302 and the controller board 204. In some instances, the cable may be a flex cable.

The interposer board 310 may include a second antenna feeding point 314 for the second antenna 306. In this instance, the cable (e.g., the first antenna feeding point 312) may be disposed at a location (or a distance) relative to the second antenna feeding point 314 and may be connected to the second antenna 306 as a grounding point for the second antenna 306.

In this regard, the second antenna 306 may be implemented as a PIFA antenna tuned to operate in a sub-6 GHz frequency range. By way of particular example, the second antenna 306 may be implemented to operate as a WLAN antenna, a WWAN antenna, and/or the like.

In some examples, the interposer board 310 may include an impedance matching circuit 316. In this instance, the impedance matching circuit 316 may be an LC circuit to tune the second antenna 306. The impedance matching circuit 316 may be coupled to the second antenna 306 to tune the second frequency range of the second antenna 306, for instance, a frequency range for a WLAN antenna, a WWAN antenna, and/or the like. In some examples, another hybrid antenna module 318 may be connected to the controller board 204, in which the hybrid antenna module 318 may include the same components, including antenna radiator(s) and an interposer board, as a hybrid antenna formed using the first antenna 302. In these examples, each of hybrid antenna modules may be positioned separated from each other and arranged to be oriented in different directions with respect to each other.

What is claimed is:

1. An apparatus comprising:

a first antenna having a first radiator and a first ground plane;

a second antenna having a second radiator and a second ground plane;

a hybrid antenna formed through coupling of the hybrid antenna to components of the first antenna and the second antenna, wherein the hybrid antenna includes a third radiator; and an electrical interface disposed between the first antenna and the second antenna, wherein the electrical interface is to couple the first ground plane to the second ground plane to form the third radiator.

2. The apparatus of claim 1, wherein the electrical interface is an interposer board that includes a first connector and a second connector, wherein the first connector is coupled to a controller and the second connector is coupled to the first antenna, the second antenna, or a combination thereof.

3. The apparatus of claim 1, wherein the electrical interface comprises:

a cable coupled between the first antenna and a controller, the cable being a feeding point for the first antenna; and a feeding point for the hybrid antenna, wherein the hybrid antenna is a planar inverted-F antenna and the cable is a grounding point for the hybrid antenna, the cable being positioned at a location relative to the feeding point for the hybrid antenna.

4. The apparatus of claim 1, wherein the electrical interface comprises:

an impedance matching circuit coupled between the first ground plane and the second ground plane to tune a frequency range of the hybrid antenna.

5. The apparatus of claim 1, wherein the first antenna and the second antenna are each tuned to operate at a higher frequency range than the hybrid antenna, and wherein the first radiator is oriented in a first direction and the second radiator is oriented in a second direction that is different than the first direction.

6. The apparatus of claim 1, wherein the hybrid antenna further comprises:

a fourth radiator connected to the first ground plane of the first antenna, the fourth radiator to extend a length of the first ground plane to tune a frequency range of the hybrid antenna.

7. An apparatus comprising:

a first antenna tuned to a first frequency range, the first antenna having a first ground plane;

a second antenna tuned to the first frequency range and positioned separate from the first antenna, the second antenna having a second ground plane;

a third antenna tuned to a second frequency range, the second frequency range being different than the first frequency range; and an interposer board disposed between the first antenna and the second antenna, the interposer board coupling the first ground plane to the second ground plane to form a first radiator of the third antenna.

8. The apparatus of claim 7, wherein the first antenna and the second antenna are patch array antennas tuned to operate as millimeter wave (mmWave) antennas and the third antenna is a planar inverted-F antenna tuned to operate as a sub-6 GHz antenna.

9. The apparatus of claim 7, wherein the interposer board comprises:

a cable coupled between the first antenna and a controller, the cable being a feeding point for the first antenna; and a signal input coupled between the third antenna and the controller, the signal input being a feeding point for the third antenna, wherein the cable is positioned at a location relative to the signal input to be a grounding point for the third antenna.

10. The apparatus of claim 7, wherein the interposer board comprises:

an impedance matching circuit coupled between the first ground plane and the second ground plane to tune the third antenna.

11. The apparatus of claim 7, wherein the third antenna further comprises:

a second radiator connected to the first ground plane of the first antenna, the second radiator to extend a length of the first radiator to tune a frequency range of the third antenna.

12. The apparatus of claim 11, wherein the second radiator is formed in a flexible printed circuit (FPC) or a laser direct structuring (LDS).

13. An apparatus comprising:

a first antenna tuned to a first frequency range, the first antenna having a ground plane;

a second antenna tuned to a second frequency range that is lower than the first frequency range, wherein the ground plane of the first antenna is connected as a first signal radiator for the second antenna; and an interposer board connecting the first antenna to a controller board, the interposer board comprising:

a first antenna feeding point for the first antenna, the first antenna feeding point being a cable that is coupled between a radiator of the first antenna and the controller board;

a second antenna feeding point for the second antenna, wherein the cable is disposed at a location relative to the second antenna feeding point and connected to the second antenna as a grounding point for the second antenna; and an impedance matching circuit coupled to the second antenna to tune the second frequency range of the second antenna.

14. The apparatus of claim 13, wherein the second antenna further comprises:

a second signal radiator connected to the ground plane of the first antenna, the second signal radiator extending a length of the ground plane to tune the second frequency range of the second antenna.

15. The apparatus of claim 13, wherein the first antenna is a patch array antenna tuned to operate as a millimeter wave antenna (mmWave) and the second antenna is a planar inverted-F antenna tuned to operate as a wireless local area network (WLAN) antenna or a wireless wide area network (WWAN) antenna.

* * * * *